(12) United States Patent
Suzuki et al.

(10) Patent No.: US 6,236,500 B1
(45) Date of Patent: May 22, 2001

(54) OPTICAL AMPLIFIER

(75) Inventors: Mikiya Suzuki; Toshio Nakamura; Akira Sasaki; Shigeru Shikii, all of Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 09/338,794

(22) Filed: Jun. 23, 1999

(30) Foreign Application Priority Data

Jun. 23, 1998 (JP) .................................................. 10-175756

(51) Int. Cl.[7] ................................. H01S 3/00; H04J 14/02
(52) U.S. Cl. ............................................. 359/341; 359/124
(58) Field of Search ....................................... 359/124, 341

(56) References Cited

U.S. PATENT DOCUMENTS 5,920,588 * 7/1999 Watanabe .

* cited by examiner

Primary Examiner—Stephen C. Buczinski
(74) Attorney, Agent, or Firm—Rabin & Champagne, P.C.

(57) ABSTRACT

There is provided an optical amplifier for reducing the optical output power difference and/or obtaining high output power across a wide wavelength band. The optical amplifier comprises a plurality of optical amplifier units connected in two or more stages. At least one of the optical amplifier units comprises a first optical component of a single input and N outputs that has an optical-demultiplexing function, and P units of optical amplification means for the individual amplification of light that is output from P (where $1 \leq P \leq N$) output terminals selected from the N (integer) output terminals of the first optical component. Second optical components are provided to the input side of the first optical component or between the output side of the first optical component and the input side of the optical amplification means. The second optical components are optical components having chromatic dispersion compensation functions, optical components having functions designed to compensate for wavelength dependency output power difference, or optical components demonstrating other required effects. The optical components are DCFs, FBGs, SMFs, optical filters, attenuators, or the like. The second optical components are provided nonselectively or selectively.

23 Claims, 12 Drawing Sheets

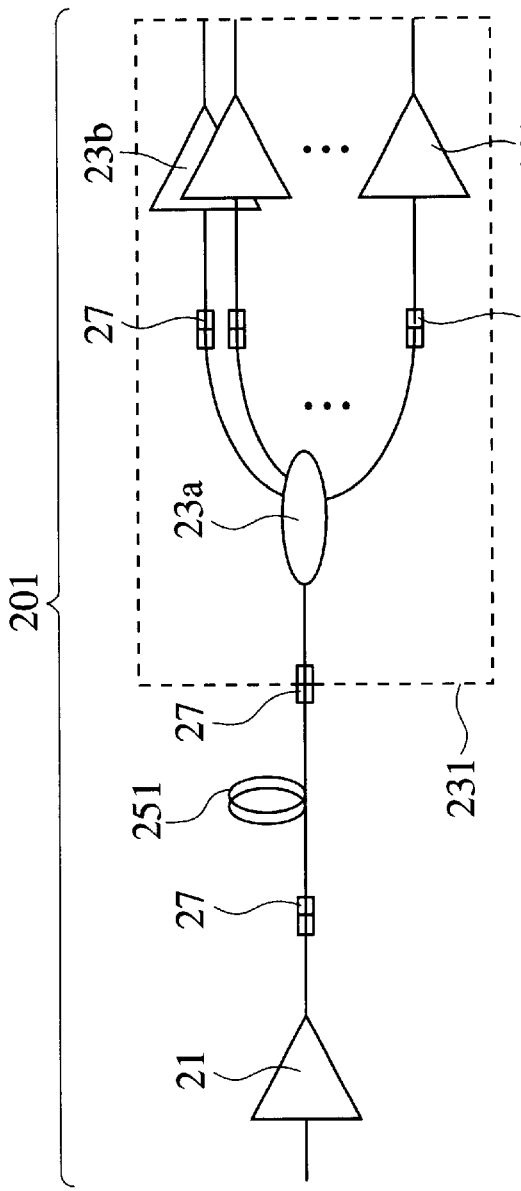
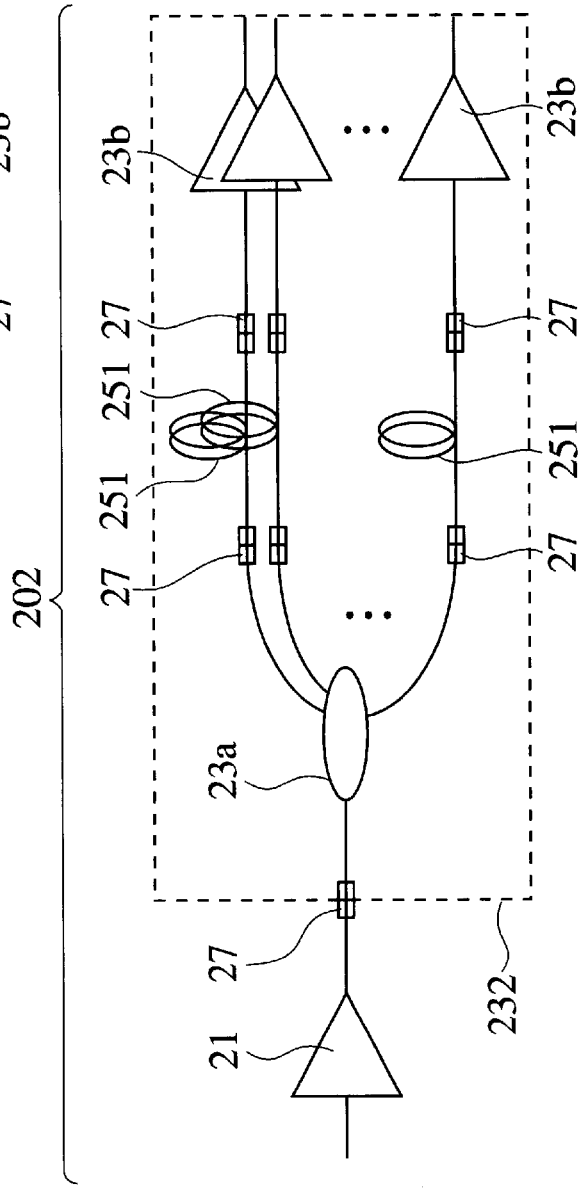
FIG.2(A)
FIG.2(B)

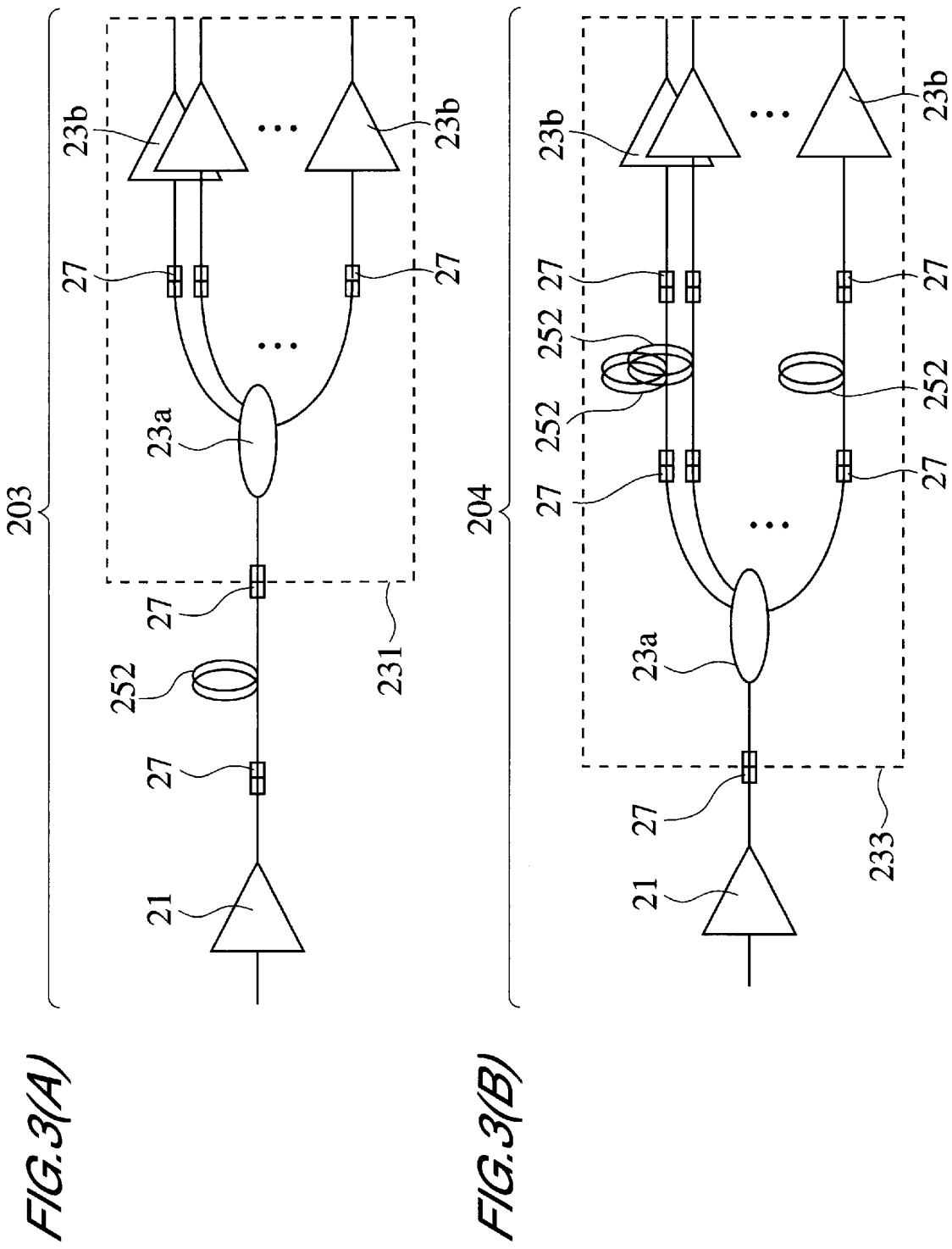

OPTICAL AMPLIFIER

BACKGROUND OF THE INVENTION

1. Field of the Invention

The present invention relates to an optical amplifier designed to compensate for the optical power loss and/or wavelength dependency output power difference occurring during transmission of a WDM (Wavelength Division Multiplexing) signal.

2. Description of Related Art

When a WDM signal is transmitted over long distances, optical amplifiers are introduced into transmission lines in order to compensate for the optical power loss in the transmission lines. Systems obtained by the multistage connection of optical amplifier units are often used as such optical amplifiers.

On the other hand, when a WDM signal is transmitted over a transmission line, nonlinear optical effects will occur in the transmission line if the WDM signal is too powerful.

DCFs (Dispersion compensating fibers) or FBGs (Fiber Bragg gratings) are commonly introduced into transmission lines in order to inhibit the formation of such nonlinear optical effects.

Both DCFs and FBGs have high optical power loss, however. Consequently, neither DCFs nor FBGs are introduced on the input or output side of an optical amplifier. The reason is that the NF (Noise Figure) increases when a DCF or FBG is introduced on the input side of an optical amplifier, and output decreases when these are introduced on the output side thereof. In view of this, DCFs or FBGs are commonly introduced between an optical amplifier unit and another optical amplifier unit (between stages). For example, in the case of a two-stage optical amplifier comprising a pre(preliminary)-stage optical amplifier unit and a post (subsequent)-stage optical amplifier unit, DCFs or FBGs are introduced between the pre-stage optical amplifier unit and the post-stage optical amplifier unit.

In the case of optical amplifiers for wavelength division multiplexing (WDM) signals, it is important that powerful output be achieved across a wide wavelength band, the optical output power difference be kept small across a wide wavelength band, a low NF be obtained, and the like. However, some of the aspects of conventional optical amplifiers still need improvement because of the following, for example.

A DCF has a wide compensation wavelength bandwidth, but it also has a nonlinear optical limit. As used herein, the term "nonlinear optical limit" refers to the light input conditions under which a nonlinear optical effect is created in a transmission line.

FIG. 12 is a diagram depicting a system comprising a conventional two-stage optical amplifier 15 composed of a pre-stage optical amplifier unit 11 and a post-stage optical amplifier unit 13. When the aforementioned DCF 17 is introduced between the pre-stage optical amplifier unit 11 and the post-stage optical amplifier unit 13, the optical input power for the DCF 17, while varying with the system, must be kept at a maximum level of no more than about +3 dBm per channel. This is the reason that the gain of the pre-stage optical amplifier unit 11 must limited, the output of the prestage optical amplifier unit 11 must be lowered by means of an attenuator, or the like.

In addition, the DCF 17 creates substantial signal transmission loss (optical power loss, approximately equal to several decibels), making it impossible for the optical amplifier 15 to generate high total output. Specifically, high output is difficult to achieve with an optical amplifier 15 obtained using DCF.

Furthermore, the total NF (NF total) of a two-stage optical amplifier 15 can be expressed as NF total=NF1+(NF2/G1), where NF1 is the NF of the pre-stage optical amplifier unit 11, NF2 is the NF of the post-stage optical amplifier unit 13, and G1 is the gain of the pre-stage optical amplifier unit 11. When, however, a DCF 17 is introduced between the pre-stage optical amplifier unit 11 and the post-stage optical amplifier unit 13, the gain of the pre-stage optical amplifier unit 11 becomes (G1−Ld), where Ld is the optical power loss of the DCF 17, and the result becomes NF total=NF1+ {NF2/(G1−Ld)}.

Ultimately, introducing a DCF into the intermediate stage of a two-stage optical amplifier 15 limits the gain of the pre-stage optical amplifier unit 11 because of the nonlinear optical limit of the DCF, and appears to further reduce the gain of the pre-stage optical amplifier unit 11 because of the optical power loss caused by the DCF 17. Consequently, the NF of the post-stage optical amplifier unit 13 affects the total NF of the optical amplifier 15.

The performance of the post-stage optical amplifier unit 13 is important for compensating the factors (limited optical input power for the DCF, and the optical power loss originating in the DCF itself) that reduce the output of the optical amplifier 15 depicted in FIG. 12. With the conventional practice of amplifying the entire wavelength bandwidth of WDM signals by a single post-stage optical amplifier unit 13, however, inherent limitations are encountered when attempts are made to achieve high output and low optical output power difference across a broad wavelength band.

On the other hand, an FBG has lower signal transmission loss (optical power loss) than a DCF. In addition, an FBG is free from nonlinear optical limits. Consequently, introducing an FBG (not shown) instead of a DCF between the pre-stage optical amplifier unit 11 and the post-stage optical amplifier unit 13 of a two-stage optical amplifier 15 yields an optical amplifier capable of chromatic dispersion compensation and makes it possible to obtain an optical amplifier in which the signal transmission loss originating in the FBG itself is reduced and in which no limitations are imposed on the optical input power for the FBG.

In the case of an FBG, however, the wavelength bandwidth within which the chromatic dispersion can be compensated for is narrow (for example, about 7 nm), limiting the bandwidth that can be transmitted by an optical amplifier when the FBG is introduced between the stages of the optical amplifier.

A need therefore existed for an optical amplifier in which higher output and lower wavelength dependency output power difference could be achieved across a wider wavelength bandwidth than in the past.

SUMMARY OF THE INVENTION

A first object of the present invention is to provide an optical amplifier designed to compensate for the high output power across a wide wavelength band.

A second object of the present invention is to provide an optical amplifier for outputting a WDM signal having low wavelength dependency output power difference across a wide wavelength band.

Aimed at attaining the stated objects, the optical amplifier of the present invention (hereinafter occasionally referred to as "the optical amplifier of the first invention") comprises an optical amplifier unit including a first optical component of M inputs and N outputs that has an optical-demultiplexing function, and P units of optical amplification means for the individual amplification of light that is output by P output terminals selected from among the N output terminals of the first optical component.

In addition, the optical amplifier of the second invention comprises an optical amplifier unit including a first optical component of N inputs and M outputs that has an optical multiplexing function, and P units of optical amplification means for the individual amplification of light to be input to P input terminals selected from the N input terminals of the first optical component, and for the individual input of this light to the corresponding input terminals.

In either amplifier, M is an integer of 1 or greater, N is an integer of 2 or greater, and P is an integer from 1 to N. M typically is 1, but is not limited to this value alone.

Since it is provided with a first optical component having an optical demultiplxing function, the optical amplifier of the first invention can, for example, separate wavelength-multiplexed signal light by wavelength or bandwidth. Out of the N types of light obtained by such optical demultiplexing, P types of light can be individually amplified by optical amplification means.

Since it is provided with a first optical component, the optical amplifier of the second invention can optically multiplex or synthesize N types of optical signals. In addition, the P types of optical signals constituting part of the N types of optical signals can be input to the first optical component after being individually amplified.

In this case, there is no need for each of the P units of optical amplification means to amplify all optical signals consisting the WDM signal. In the case of the optical amplifier of the first invention, for example, the separated optical signals (that is, signal light) can be amplified by optical amplification means used exclusively with the optical signals. In addition, in the case of the optical amplifier of the second invention, some of the optical signals belonging to the P types of optical signals should be amplified by optical amplification means used exclusively with these optical signals. Either of these amplifiers can amplify optical signals within a narrower bandwidth than in the past. Each optical amplifier can therefore amplify separated optical signals as desired, respectively. Consequently, a WDM signal obtained by synthesizing optical signals that are output by each of the optical amplification means has higher output and a smaller optical output power difference across a broad wavelength band.

The first and second inventions can be adapted to optical amplifiers having a single optical amplifier unit, to optical amplifiers obtained by connecting two or more optical amplifier units in multiple stages, and to various other optical amplifiers.

When the first invention is worked, second optical components should preferably be provided to the input terminals of the first optical component and/or between the input terminals of the optical amplification means and the corresponding output terminals of the first optical component. When the second invention is worked, second optical components should preferably be provided to the output terminals of the first optical component and/or between the output terminals of the optical amplification means and the corresponding input terminals of the first optical component.

BRIEF DESCRIPTION OF THE DRAWINGS

The foregoing and other objects, features and advantages of the present invention will be better understood from the following description taken in connection with the accompanying drawings; in which:

FIG. 2 (includes FIGS. 2A and 2B) is a diagram illustrating a specific configuration example of the optical amplifier pertaining to the first aspect of the embodiment of the present invention, wherein FIGS. 2A and 2B are diagrams designed to illustrate two different configurational examples of using DCFs as the second optical components;

FIG. 3 (includes FIGS. 3A and 3B) is a diagram illustrating a specific configuration example of the optical amplifier pertaining to the first aspect of the embodiment of the present invention, wherein FIGS. 3A and 3B are diagrams designed to illustrate two different configurational examples in which FBGs are used as the second optical components;

DESCRIPTION OF THE PREFERRED EMBODIMENTS

Figure 1:
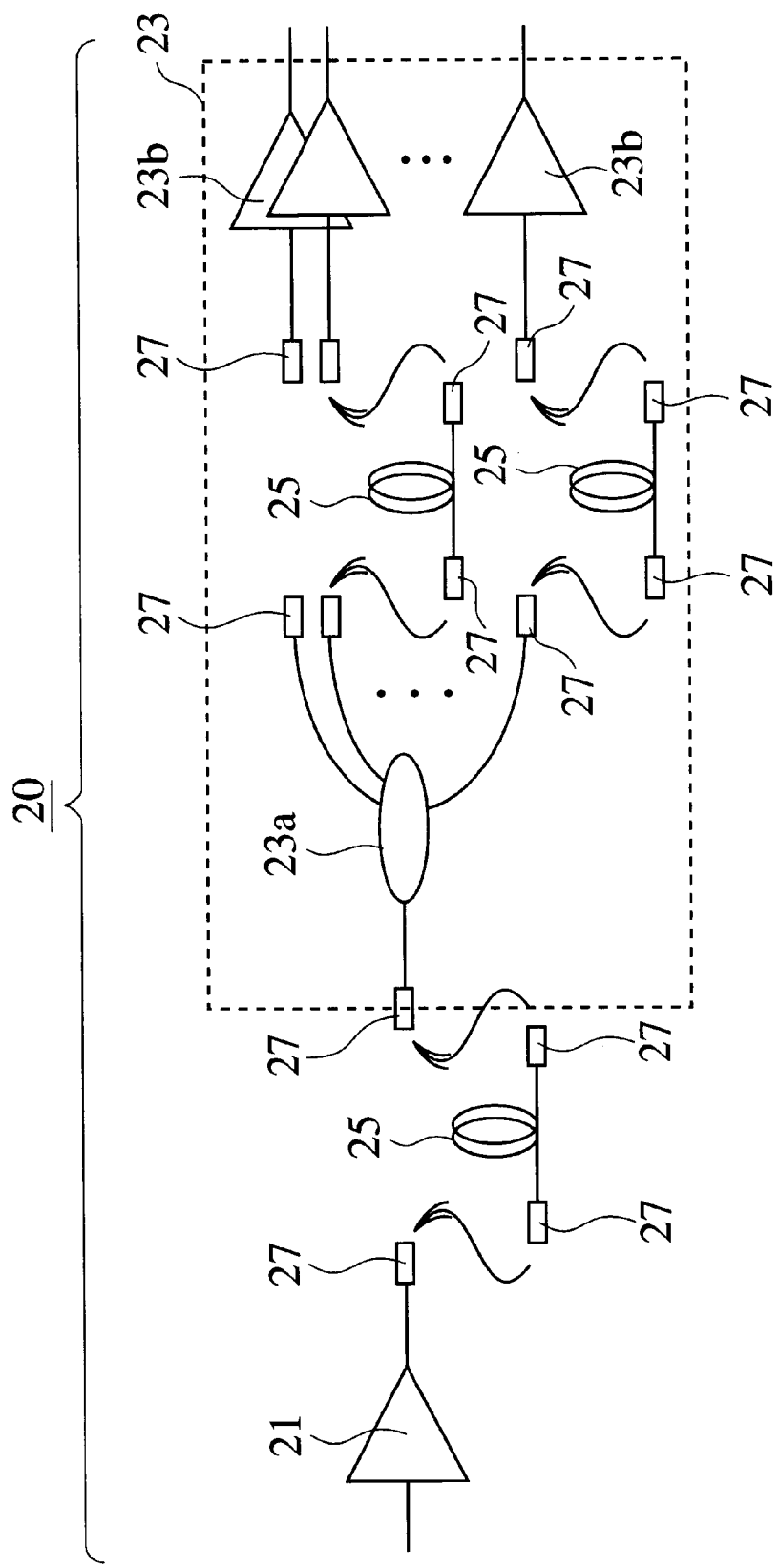
FIG. 1, which is a diagram illustrating an optical amplifier having an optical-demultiplexing or wavelength-division function and pertaining to a first aspect of the embodiment of the present invention, depicts a configurational example in which the constituent elements are connected using optical connectors, and in which nonselective second optical components are introduced and connected between the desired constituent elements.

With reference to drawings, embodiments of the optical amplifier of the present invention will now be described. The drawings used in the description are provided solely as schematic representations designed to aid in the understanding of the present invention. In addition, the same constituent elements in the drawings are designated with identical symbols, and overlapping descriptions are occasionally omitted.

(1) Embodiments of the First Invention

First Embodiment

FIG. 1 is a diagram depicting the structure of the optical amplifier 20 of the first embodiment. The optical amplifier 20 of the first embodiment is an optical amplifier obtained by the cascade connection of two stages of optical amplifier units: a pre-stage optical amplifier unit 21 and a post-stage optical amplifier unit 23.

In the present invention, the post-stage optical amplifier unit 23 is configured as an optical amplifier unit comprising a first optical component 23a of a single input and N outputs that has an optical-demultiplexing or wavelength-division function, and N units of optical amplification means 23b provided in accordance with the N output terminals of the first optical component 23a. N is an arbitrary integer of 2 or greater.

The task of each of the N units of optical amplification means 23b is to amplify light or an optical signal that is output from the corresponding output terminals of the first optical component 23a.

In the configurational example depicted in FIG. 1, N units of optical amplification means 23b are provided in accordance with the N output terminals of the first optical component 23a. Occasionally, however, optical amplification means 23b whose number is less than N may be provided. Specifically, the value of P in the "P units of optical amplification means" referred to in the present invention may be an integer of N−1 or less. In other words, the relation 1≦P≦N should hold.

In preferred practice, the optical amplifier 20 further comprises second optical components 25 for performing chromatic dispersion compensation functions, performing compensation for wavelength dependency output power difference, or performing other required actions in relation to signal light. The second optical components 25 can be provided in a-the following three ways. A first method entails placing a component between the output terminal of the pre-stage optical amplifier unit 21 and the input terminal of the first optical component 23a. A second method entails placing the components between some or all of the input terminals of the N units of optical amplification means 23b and the corresponding output terminals of the first optical component. A third method entails joint use of the aforementioned first and second methods.

In the configurational example of the optical amplifier 20 depicted in FIG. 1, optical connectors 27 are individually provided to each of the terminals of the first optical component 23a, to the input terminals of the each of the optical amplification means 23b, and to the terminals of the second optical components 25. Connections between the constituent elements can be made using these optical connectors 27.

Optical fibers may be welded (or fused splicing) with each of the constituent elements, connecting the constituent elements with each other. In this case, however, much work is involved in cutting the connections when, for example, the relation among the connections is to be changed or the like. For example, the relation among the connections for the optical components 21, 23a, 23b, and 25 can be easily changed or the like by providing optical connectors to the input terminals and/or output terminals of the optical components.

In the optical amplifier 20, the pre-stage optical amplifier unit 21 itself and each of the optical amplification means 23b in the post-stage optical amplifier unit 23 can be configured as any appropriate optical amplification means; for example, as erbium-doped fiber amplifiers (EDFAs).

The first optical component 23a can be configured as any appropriate optical component having an optical-demultiplexing function; for example, an optical component possessing wavelength selectivity and performing the functions of an optical coupler. An example is a so-called NDM coupler.

The first optical component 23a can separate wavelengths according to any appropriate method that conforms to the design. Examples include wavelength-separation methods in which signal light obtained by multiplexing n wavelengths is separated into n number of signal light having different wavelengths; wavelength-separation methods in which such a WDM signal is separated into a plurality of types of signal light having different groups of wavelengths, that is, different wavelength bandwidths; and the like. With the optical amplifier of the present invention, any of these wave separation methods may be used.

In addition, the second optical components 25 can be composed of any appropriate components that meet specifications. It is possible, for example, to adopt as the second optical components optical components having chromatic dispersion compensation functions or optical components devoid of such chromatic dispersion compensation functions. DCF, B and the like are specific examples of the former. SMF (Single mode fiber), optical (or optical wavelength) filters, attenuators, and the like are specific examples of the latter.

An optical component having the function of compensating for the wavelength-induced optical output power difference (that is, a component having the function of compensating for the wavelength dependency output power difference) may be used as an optical component devoid of chromatic dispersion compensation functions. The aforementioned optical filters, attenuators, and the like are examples of such optical components.

In addition, the aforementioned optical connectors 27 may be the conventionally known optical connectors.

The optical amplifier 20 may be configured such that signal light is individually output from each of the optical amplification means 23b of th e post-stage optical amplifier unit 23, or such that this signal light is output as WDM signals after being optically multiplexed or synthesized. In preferred practice, the post-stage optical amplifier unit 23 should preferably be provided with any appropriate internal optical multiplexing or synthesizing means (not shown) when the multiplexed or synthesized signal light is output.
(Description of Configurational Example in which Internal DCFs are Provided)

The following two configurations can, for example, be adopted when the optical amplifier 20 of the first embodiment depicted in FIG. 1 is provided with internal DCFs 251 as the second optical components 25. FIGS. 2A and 2B are diagrams illustrating this.

First, in the configurational example of an optical amplifier 201 depicted in FIG. 2A, a second optical component 25 is connected by means of optical connectors 27 and is interposed between the pre-stage optical amplifier unit 21 and the post-stage optical amplifier unit 231 in the configuration depicted in FIG. 1. Specifically, a DCF 251 is introduced as the second optical component 25 depicted in FIG. 1 between the output terminal of the pre-stage optical amplifier unit 21 and the input terminal of the first optical component 23a. Consequently, the input terminal of the DCF 251 and the output terminal of the pre-stage optical amplifier unit 21 are connected by an optical connector 27. In addition, the output terminal of the DCF 251 and the input terminal of the first optical component 23a are connected by another optical connector 27. Furthermore, the respective input terminals of the optical amplification means 23b are connected by means of individual optical connectors 27 to the N optical output terminals of the first optical component 23a in the post-stage optical amplifier unit 231. In this case, the pre-stage optical amplifier unit 21 should preferably be composed of an EDFA, for example.

In the case of the optical amplifier 201 depicted in FIG. 2A, pumping light is directed to the pre-stage optical amplifier unit 21 from a pumping or pumping radiation source (not shown). When a WDM signal having n wavelengths is input simultaneously as signal light to the pre-stage optical amplifier unit 21 irradiated with pumping light (where n is an integer of 2 or greater), this signal light is gradually amplified in the pre-stage optical amplifier unit 21 by induced emission action. The amplified signal light is output from the pre-stage optical amplifier unit 21.

Light that is output from the pre-stage optical amplifier unit 21 is input to the post-stage optical amplifier unit 231 through the DCF 251 (second optical component). The input signal light is input to a WDM coupler (first optical component 23a) and optically demultiplexed (or separated) there. Each part of the demultiplexed or separated signal light is individually amplified by an optical amplification means 23b used exclusively with the signal light of the corresponding wavelength.

Here, each of the optical amplification means 23b can amplify the signal light separated by the WDM coupler. Specifically, signal light of a narrower wavelength bandwidth than in the past can be amplified. Each of the optical amplification means 23b is therefore capable of producing light of high output power and of small optical output power difference. Combining light that is output from each of the optical amplification means 23b will therefore yield a WDM signal that has high output power across a broad wavelength band and that has a small optical output power difference within each band. In addition, a single DCF 251 is needed for the optical amplifier depicted in FIG. 2A.

Since the DCF 251 in the optical amplifier 201 depicted in FIG. 2A is positioned directly behind the pre-stage optical amplifier unit 21, care should be exercised to ensure that the optical input power for the DCF 251 is, for example, equal to or lower than +3 dBm per channel, taking into account the nonlinear optical effect for the DCF 251. As already noted above, there are cases in which an attenuator (not shown) must, for example, be provided to the preceding stage of the DCF 251, or other measures must be undertaken when high optical input power is achieved.

In the case of an optical amplifier 201 configured as shown in FIG. 2A, the total NF is equal to NF total=NF1+{NF2/(G1−Ld−Lc)}, where Lc is the optical power loss in the first optical component 23a, Ld is the optical power loss in the DCF 251 (second optical component 25), NF1 is the NF in the pre-stage optical amplifier unit 21, NF2 is the NF in all the optical amplification means 23b of the post-stage optical amplifier unit 231, and G1 is the gain in the pre-stage optical amplifier unit 21. As already noted above, the total NF is equal to NF total=NF1+{NF2/(G1−Ld)} in the case of the conventional optical amplifier described with reference to FIG. 11, indicating that the optical amplifier 201 configured as shown in FIG. 2A has a greater NF total than the conventional optical amplifier 15 described using FIG. 11.

Next, the pre-stage optical amplifier unit 21 and the post-stage optical amplifier unit 232 in an optical amplifier 202 configured as shown in FIG. 2B are directly connected using an optical connector 27. In the optical amplifier 202, the output terminal of the pre-stage optical amplifier unit 21 and the input terminal of the first optical component 23a are directly connected by the optical connector 27. The post-stage optical amplifier unit 232 comprises DCFs 251 (first optical components) and optical amplification means 23b, and has a structure in which respective DCFs 251 are introduced and connected as second optical components between each of the N output terminals of the first optical component 23a and each of the input terminals of the optical amplification means 23b by means of individual optical connectors 27.

In the configurational example of an optical amplifier depicted in FIG. 2B, signal light amplified by the pre-stage optical amplifier unit 21 is separated by the first optical component 23a of the post-stage optical amplifier unit 232. Each part of the optically demultiplexed or separated signal light is individually amplified by an optical amplification means 23b used exclusively with this signal light. The signal light of each wavelength or channel from the optical amplifier 202 can therefore be optically multiplexed or synthesized and made into a WDM signal for the same reasons as in the case of the optical amplifier 201 pertaining to the configurational example depicted in FIG. 2A. The WDM signal thus obtained has high output power across a broad wavelength band and possesses an improved optical output power difference within each band.

In addition, the optical amplifier 202 pertaining to the configurational example depicted in FIG. 2B is configured such that a WDM coupler (first optical component 23a) is positioned in front of the DCFs 251, making it possible to reduce the optical input power for the DCFs 251 by means of the WDM coupler itself.

Specifically, as already noted above, the optical input power for the DCFs 251 must, for example, be kept at or below +3 dBm per channel because of considerations related to the nonlinear optical effect for the DCFs 251. Attenuators or the like must be provided between the pre-stage optical amplifier unit 21 and the DCFs 251 if the WDM signal does not satisfy the condition for the optical input power. In the case of the optical amplifier 202 depicted in FIG. 2B, however, it is possible to dispense with the need for such optical attenuators if the output of the pre-stage optical amplifier unit 21 is kept by the first optical component 23a at a level such that optical power per channel remains below the nonlinear optical limit.

Figure 11:
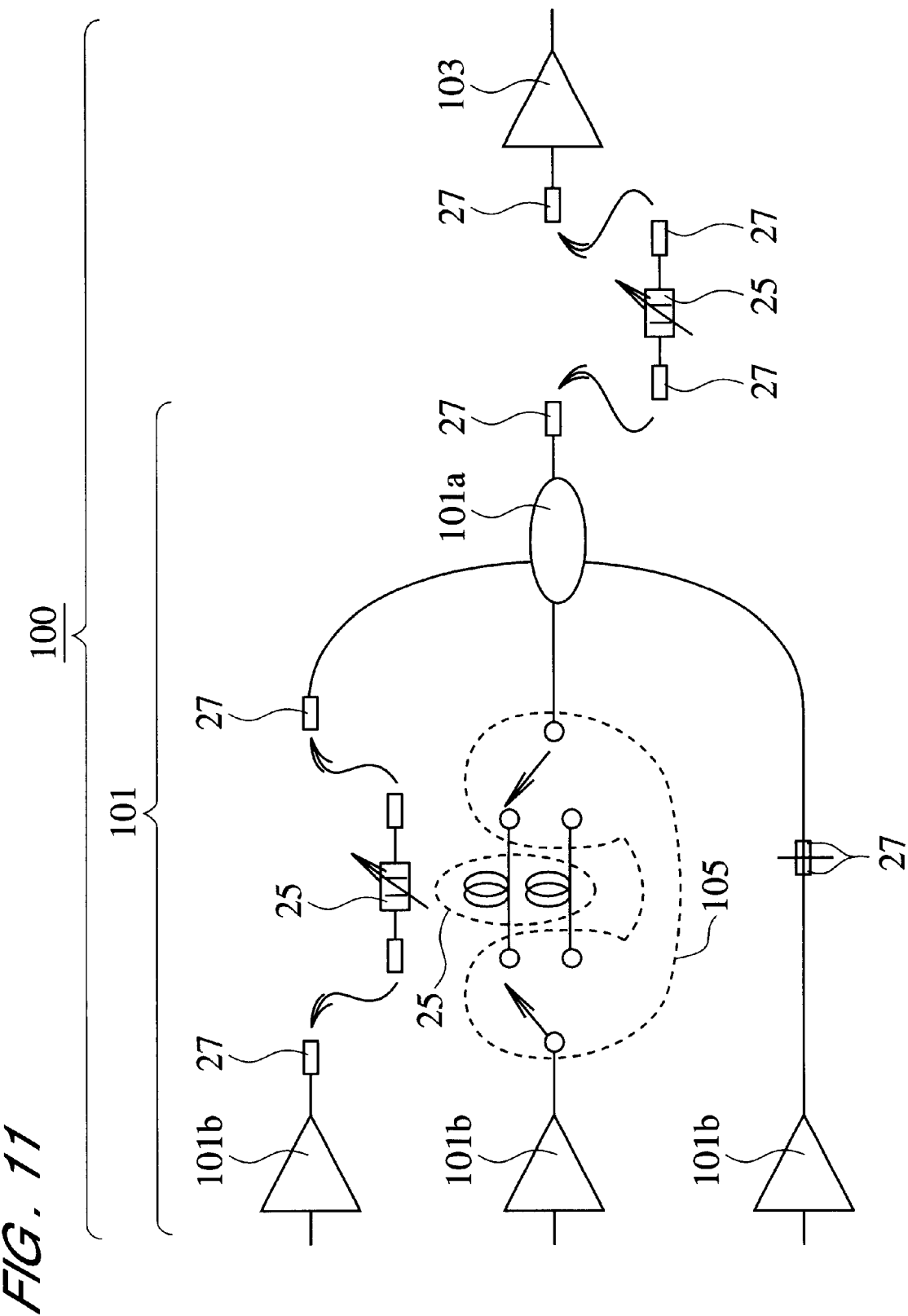
FIG. 11 is a diagram illustrating a configurational example of optical amplifier having an optical multiplexing function and pertaining to an aspect of the embodiment of the present invention.
Figure 12:
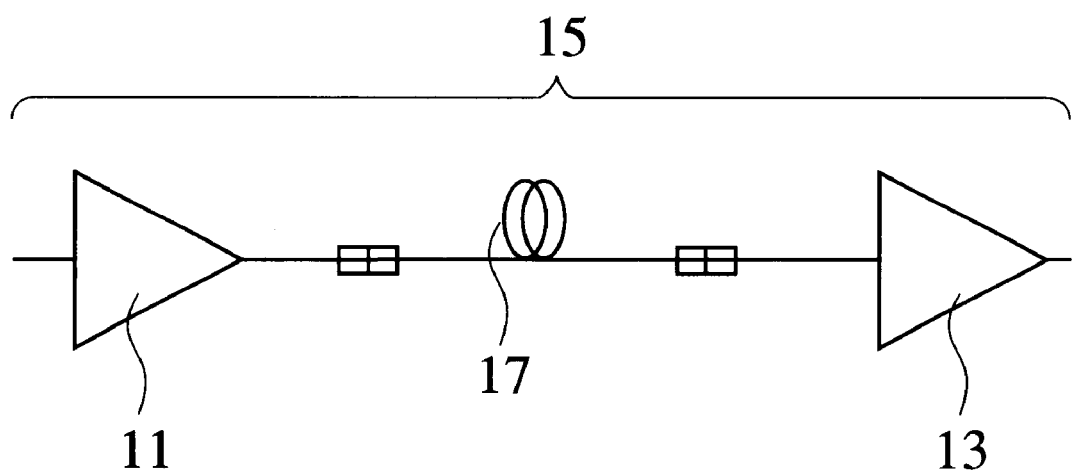
FIG. 12 is a block diagram designed to illustrate a conventional optical amplifier and the problems to be addressed in connection with the prior art.

For the optical amplifier 202 pertaining to the configurational example depicted in FIG. 2B, the total NF is equal to NF total=NF1+{NF2/(G1−Ld)}, which is the same as in the case of the conventional optical amplifier described using FIG. 11, indicating that the loss due to the first optical component 23a has no effect on NF total.

In the case of the optical amplifier 202 pertaining to the configurational example depicted in FIG. 2B, the number of DCFs 251 must be the same (that is, N) as the number of output terminals of the first optical component 23a.

(Description of Configurational Example in which Internal FBGs are Provided)

In the optical amplifier 20 of the first embodiment depicted in FIG. 1, it is possible to provide internal FBGs instead of internal DCFs and to compensate for chromatic dispersion. FIGS. 3A and 3B depict configurational examples of FBG-equipped optical amplifiers that correspond to the amplifiers in FIGS. 2A and 2B, respectively. In FIG. 3, the optical amplifier is designated as 203, and the FBGs used as the second optical components 25 depicted in FIG. 1 are designated as 252.

Since the optical power loss of the FBGs as such is lower than that of the DCFs described above, compensating for chromatic dispersion by means of FBGs makes it possible to achieve high output power across a broad wavelength band, to obtain a small optical output power difference across a broad wavelength band, to provide a low NF, and to meet other optical amplifier requirements more readily than when DCFs are used.

When the optical amplifier 203 is provided with internal FBGs 252, the following two configurations can be obtained in the same manner as when internal DCFs are provided.

The first configuration is one in which an FBG 252 is provided instead of the DCF 251 to the configuration depicted in FIG. 2A. Specifically, this is a configuration in which the FBGs 252 are introduced as a second optical component between the output terminal of the pre-stage optical amplifier unit 21 and the input terminal of the first optical component 23a, and the input terminals of the optical amplification means 23b are individually connected to the N output terminals of the first optical component 23a. In this configuration, a single FBG 252 is sufficient.

In the case of an FBG 252, the nonlinear optical limit can be ignored, but the chromatic dispersion can be compensated only within a narrow wavelength band (about 7 nm). An optical amplifier 203 configured as shown in FIG. 3A, that is, provided with an internal FBG 252 as a second optical component, is therefore suitable for cases in which the signal light being handled is narrow-band signal light (about 7 nm).

In the case of an optical amplifier 203 pertaining to the configurational example depicted in FIG. 3A, a WDM signal loses about 3 dB of its optical power (optical power loss in FBG+circulator) when passing through the FBG 252, and then enters the first optical component 23a. The WDM signal is then optically demultiplexed or separated by the first optical component 23a. Each part of the separated signal light is individually amplified by an optical amplification means 23b used exclusively with this signal light. Because in this case the signal light separated by the first optical component 23a can be individually amplified by the optical amplification means 23b, an optical amplifier 203 of high output power and low optical output power difference can be obtained for the same reasons as those previously described with reference to the case in which a DCF was adopted.

The second configuration is one in which FBGs are provided (instead of the DCFs 251 in the post-stage optical amplifier unit 232) to the structure of the optical amplifier 202 depicted in FIG. 2B. A configurational example of the optical amplifier obtained using FBGs is depicted in FIG. 3B, where 204 indicates an optical amplifier, and 233 indicates a post-stage optical amplifier unit. Specifically, the output terminal of the pre-stage optical amplifier unit 21 and the input terminal of the first optical component 23a in the optical amplifier 204 are directly connected by an optical connector 27. The post-stage optical amplifier unit 233 comprises a first optical component 23a, FEGs 252 (second optical components), and optical amplification means 23b. In the optical amplifier 204 of this configurational example, the FBGs 252 are introduced and connected as second optical components between each of the N output terminals of the first optical component 23a and each of the input terminals of the optical amplification means 23b by means of individual optical connectors 27.

The optical amplifier 204 configured as shown in FIG. 3B can be used even when the signal light being handled is wideband signal light. This is because signal light is optically demultiplexed or separated by the first optical component 23a, and parts of the separated signal light are then input to the FBGs 252. Specifically, during the separation of signal light, WDM signals can be separated into bandwidths (for example, a maximum of about 7 nm) in which the chromatic dispersion can be compensated for with the FBGs 252, and the separation results can be input into the FBGs 252 that correspond to the respective portions of separated light. In this configuration, however, the number of FBGs 252 must be the same (that is, N) as the number of output terminals of the first optical component 23a.

Second Embodiment

Figure 4:
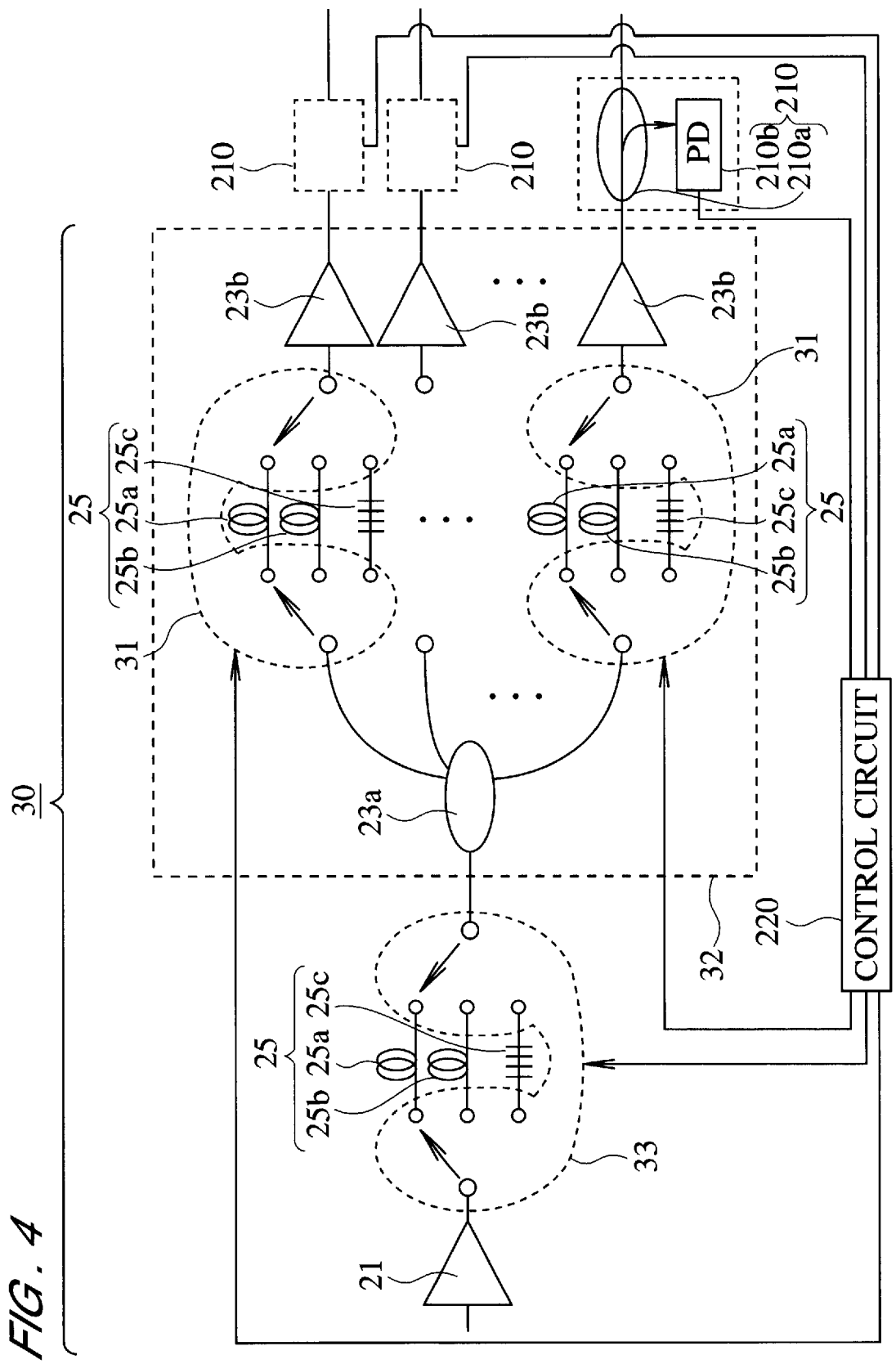
FIG. 4, which is a diagram illustrating an optical amplifier having an optical-demultiplexing or wavelength-division function and pertaining to a second aspect of the embodiment of the present invention, depicts a configurational example in which the constituent elements can be connected without the use of optical connectors, and selective second optical components (a plurality of suboptical components) can be selectively introduced and connected between the desired constituent elements.

FIG. 4 is a diagram illustrating a configurational example of an optical amplifier 30 pertaining to a second embodiment. The optical amplifier 30 pertaining to the second aspect of the embodiment is different from the first aspect of the embodiment in that optical switches and a plurality of suboptical components (which correspond to second optical components) are used to form the required connections between the constituent elements depicted in FIG. 1, that is, between the optical components 21 and 23a, and/or 23a and 23b. Using optical switches allows connections between the required constituent elements to be made by selecting the desired suboptical components from among a plurality of suboptical components, and forming the connections by means of the selected suboptical components. In the optical amplifiers 201–204 of the above-described first embodiment (in which such optical switches are dispensed with), connections between the required constituent elements can only be made by means of a single fixed second optical component 25. In the optical amplifier of the second embodiment, on the other hand, the required suboptical components are selected from among a plurality of suboptical components by means of optical switches, and connections are then made. The first and second embodiments differ from each other in this respect.

The post-stage optical amplifier unit 32 of the optical amplifier 30 depicted in FIG. 4 comprises second optical components 25, each of which is obtained by grouping together a plurality of types (Q types, where Q is any integer of 2 or greater) of suboptical components 25a–25c between the N output terminals of the first optical component 23a and the input terminals of the optical amplification means 23b corresponding to these output terminals.

The post-stage optical amplifier unit 32 further comprises a first optical component 23a, a plurality of optical amplification means 23b, and first optical switches 31 for introducing (connecting) any of the plurality of types of suboptical components 25a–25c between the output terminals of the first optical component 23a and the corresponding input terminals of the optical amplification means 23b. In this case, the first optical switches 31 can be directly connected to the first optical component 23a and the optical amplification means 23b by a conventional welding technique without the use of optical connectors.

The optical amplifier 30 further comprises separate suboptical components 25a–25c as a plurality of types (R types, where R is an integer of 1 or greater; R=Q is also acceptable) of second optical components disposed between the output terminal of the pre-stage optical amplifier unit 21 and the input terminal of the first optical component 23a.

The optical amplifier 30 further comprises a second optical switch 33 for introducing (connecting) a plurality of types of second optical components 25 between the pre-stage optical amplifier unit 21 and the first optical component 23a, that is, for introducing (connecting) any of the suboptical components 25a–25c between the output terminal of the pre-stage optical amplifier unit 21 and the input terminal of the first optical component 23a. The second optical switch 33, the pre-stage optical amplifier unit 21, and the first optical component 23a can be directly connected by welding or another conventional technique without the use of connectors.

Any optical components that conform to the design of the optical amplifier can be used as the second optical components 25, that is, suboptical components 25a–25c. As noted with reference to the first embodiment, examples of such suboptical components include DCF, FBG, optical filters, attenuators, SMF, and the like.

Any appropriate combination that conforms to the design can be selected for the suboptical components of the second optical components 25 being installed at the required locations. Identical or different combinations can therefore be selected for the suboptical components comprising individual second optical components 25.

In the optical amplifier 30 pertaining to the second aspect of the embodiment depicted in FIG. 4, any of the suboptical components 25a–25c can be arbitrarily introduced between the pre-stage optical amplifier unit 21 and the first optical component 23a by the operation of the second optical switch 33. In addition, any of the suboptical components 25a–25c can be arbitrarily introduced between the output terminals of the first optical component 23a and the corresponding optical amplification means 23b by the operation of the first optical switches 31.

To operate the optical switches 31 and 33 in such a configuration, the stage post to the optical amplifier 30, that is, the output transmission line of each optical amplification mean 23b, must be provided with a detector (also referred to as "receiver") for detecting optical output power, as well as with a control circuit for controlling at least some of the corresponding optical switches 31 and 33 in response to the detection signal from the receiver. In FIG. 4, 210 this detector is designated as 210, and the control circuit is designated as 220.

In this configurational example, each detector 210 comprises an optical demultiplexer 210a connected to the output port of the optical amplifier 23b, and a photoelectric conversion element such as a photodiode (PD) 210b for outputting a detection signal in response to the optical output produced by the optical demultiplexer 210a as a result of wavelength separation. Although only the optical demultiplexer 210a and PD 210b of a single detector 210 are shown in FIG. 4 by way of a typical example, the other detectors are also provided with such optical demultiplexers and PDs, which are disposed in the same manner between the control circuit 220 and the corresponding optical amplification means 23b. In addition, these detectors 210 provide an output for every optical signal.

Each optical amplification means 23b outputs a plurality of types of signal light. In the optical amplifier, optical signals corresponding to N (N>1) channels are amplified, and the state of power of each optical output is fed to the control circuit 220 by the detectors 210, which are installed on the transmission lines in the stages that follow the optical amplifier 30. The control circuit 220 analyzes the output spectra of the detected optical signals.

The control circuit 220 operates in the manner described below if the outputs of all or some of the optical amplification means 23b has not been obtained as designated power as a result of analysis. Specifically, the optical switch 31 corresponding to a prescribed optical amplification means 23b receives a control signal for selecting a low-attenuation optical attenuator from among a plurality of optical attenuator having various attenuation levels, and the selected optical switch 31 is actuated. In this case, attenuation can also be varied in response to the control signal when variable-attenuation optical attenuators are provided between the switching terminals of the optical switch 31.

Alternatively, the control circuit 220 operates in the manner described below if the desired gain difference characteristics cannot be obtained as a result of the aforementioned analysis of output spectra. Specifically, the control circuit 220 presents the optical switch 33 with a control signal for selecting, from a plurality of gain-equalizing filters having various gain characteristics, a filter for equalizing gain characteristics that is capable of producing the desired characteristics. The optical switch 33 is actuated by this control signal, and the aforementioned gain characteristic-equalizing filter is connected to the transmission line. The gain characteristics of optical signals can therefore be equalized in response to the control signal.

There are, however, cases in which the desired gain characteristics cannot be obtained by controlling these gain characteristics. In such cases the control circuit 220 operates in the following manner. Specifically, each optical switch 31 receives a control signal for allowing this optical switch 31 to select a low-attenuation optical attenuator from among a plurality of optical attenuator having various attenuation levels in cases in which the optical power of optical signals is too low in comparison with a prescribed level. The optical switch 31 is actuated by this control signal, and the low-attenuation optical attenuator is connected to the transmission line. On the other hand, when the optical power of the optical signals is too high in comparison with a prescribed level, the optical switch 31 receives a control signal for selecting a high-attenuation optical attenuator. The optical switch 31 is actuated by this control signal, and the high-attenuation optical attenuator is connected to the transmission line. The optical power of the optical signals that are input to the post-stage amplifier 23b is thus kept constant, making it possible to achieve the desired gain difference. It is also possible in this case to vary attenuation in response to the control signal when variable-attenuation optical attenuators are provided.

When optical components are connected by optical connectors, it is important that the optical connectors be cleaned in cases if the connections among the components are to be changed. This is because loss occurs if the end faces of optical connectors are soiled. Another reason is that the end faces are scorched at certain optical power levels if substances such as dust remain between the end faces of the optical connectors, which may be rendered unusable in extreme cases.

By contrast, the second embodiment in which optical switches are provided allows the optical waveguides in the optical switches to be, for example, switched from the outside by electrical or magnetic action without replacing the optical switches themselves. The suboptical components to be used for the transmission of optical signals are selected by the switching of the optical switches. Consequently, an optical amplifier arrangement obtained using such optical switches is free from the drawbacks described above with reference to the use of optical connectors. A highly reliable optical amplifier can therefore be obtained, making it possible, for example, to design an optical amplifier capable of handling signal light of higher power than in the first aspect of the embodiment.

In addition, suboptical components (second optical components) can be easily switched merely by actuating the optical switches, making it possible to create an optical amplifier capable of rapidly responding to changes in the environment (changes in transmission lines, changes in optical amplifier specifications, or the like).

For example, electronic waveguide-type optical switches, which can be switched by the application of electric current, voltage, or the like from the outside, are particularly suitable as the above-described optical switches.

Third Embodiment

The output characteristics of a WDM signal commonly exhibit a wavelength dependency when this signal is amplified with an EDFA. Specifically, an EDFA exhibits output characteristics that posses wavelength dependency output power difference.

When signal light that has wavelength dependency output power difference is amplified with a multistage EDFA, an S/N bias that depends on the wavelength is sometimes created and, in extreme cases, part of the signal is sometimes lost or another problem encountered.

In particular, the biggest problem with the optical output power difference is the increase in optical intensity in a specific wavelength band. To take optical amplification in the 1.5-$\mu$m band as an example, optical intensity often increases near a wavelength of 1530 nm. As a result, light near the 1530-nm wavelength is intensified with multistage amplification.

Intensification of light near the 1530-nm wavelength enhances the pumping light consumed by the signals in this wavelength band.

The quantity of pumping light consumed by the entire optical amplifier can be lowered by reducing the buildup of the optical intensity distribution near the 1530-nm wavelength. Power consumption of the entire optical amplifier can thus be reduced.

In the optical amplifier of the present invention, signal light is optically demultiplexed or separated by the first optical component 23a, and this light is amplified separately for each of the separated unit wavelengths and each group of bandwidth wavelengths, making it possible to reduce the optical output power difference at each wavelength or channel to a certain extent in the manner described with reference to the first aspect of the embodiment.

In the optical amplifier of the present invention, any second optical component 25 that conforms to the design can be provided between the output terminal of the pre-stage optical amplifier unit 21 and the input terminal of the first optical component 23a, and/or between the optical amplification means 23b and the output terminals of the first optical component 23a in the post-stage optical amplifier unit 42, as previously described, for example, with reference to FIG. 1 or 4.

It is therefore possible to further reduce the optical output power difference by adopting an approach in which optical components whose functions allow wavelength dependency output power difference to be compensated for are used in a constructive manner as such arbitrary optical components. The third embodiment is a configurational example of an optical amplifier in which a reduced optical output power difference can be achieved.

Figure 5:
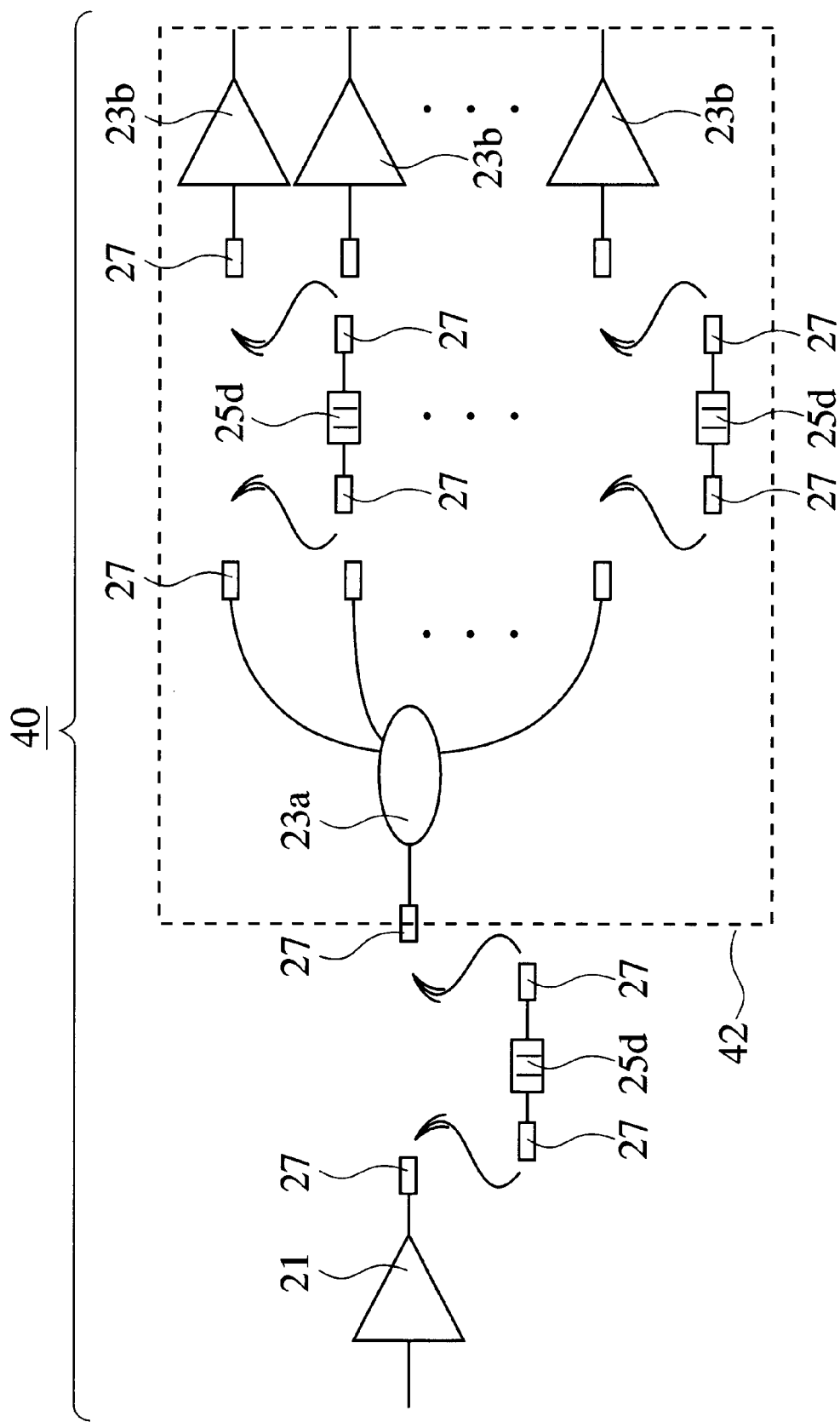
FIG. 5, which is a diagram illustrating an optical amplifier having an optical-demultiplexing or wavelength-division function and pertaining to a third aspect of the embodiment of the present invention, depicts a configurational example of an optical amplifier that can be designed for reduced wavelength dependency output power difference.

FIG. 5 is a diagram illustrating a configurational example of an optical amplifier 40 pertaining to the third embodiment. The optical amplifier 40 comprises a suboptical component 25d designed to compensate for wavelength dependency output power difference and installed as the second optical component 25 depicted in FIG. 1 between the output terminal of the pre-stage optical amplifier unit 21 and the input terminal of the first optical component 23a. Alternatively, such suboptical components 25d designed to compensate for wavelength dependency output power difference may be provided, instead of the above-described configuration or in addition thereto, as the second optical components 25 depicted in FIG. 1 between P (where P is an integer from 1 to N) output terminals selected from among the N output terminals of the first optical component 23a, and the corresponding optical amplification means 23b.

Examples of components that can be used as the suboptical components 25d (second optical components) include optical filters whose transmission characteristics allow the transmissivity of light in the readily intensified wavelength bands to be reduced below the level achieved in other wavelength bands; attenuators capable of compensating for wavelength dependency output power difference; and SMFs.

According to the optical amplifier 40 pertaining to the third embodiment, the following effects can be obtained in addition to the effects achieved with the optical amplifier pertaining to the first embodiment.

Even when buildup occurs in the optical intensity distribution near a specific wavelength band (for example, at a wavelength of 1530 nm), this buildup can be attenuated in the pre-stage optical amplifier unit 21 by the second optical components (that is, suboptical components) 25d, which are disposed between the pre-stage optical amplifier unit 21 and the first optical component 23a, and/or between the output terminals of the first optical component 23a and the optical amplification means 23b.

When the buildup of the optical intensity distribution near the 1530 nm wavelength can be attenuated, the wasteful consumption of pumping light resulting therefrom is reduced, making it possible to obtain high output near the 1550 nm wavelength in the post-stage optical amplifier unit 42. The power consumption and wavelength dependency output power difference of the optical amplifier can therefore be reduced.

Fourth Embodiment

The third aspect of the embodiment was described with reference to an example in which a single second optical component 25d capable of compensating for the wavelength dependency output power difference was provided between the output terminal of the pre-stage optical amplifier unit 21 and the input terminal of the first optical component 23a, and/or between the output terminals of the first optical component 23a and the input terminals of the optical amplification means 23b in the post-stage optical amplifier unit 42 (see FIG. 5).

It is also possible, however, to use a configuration in which a plurality of optical components capable of compensating for the wavelength dependency output power difference are prepared in advance between the output terminal of the pre-stage optical amplifier unit 21 and the input terminal of the first optical component 23a, and/or between the output terminals of the first optical component 23a and the input terminals of the optical amplification means 23b, and these optical components are arbitrarily switched. A fourth embodiment pertains to such a configurational example of an optical amplifier 50.

Figure 6:
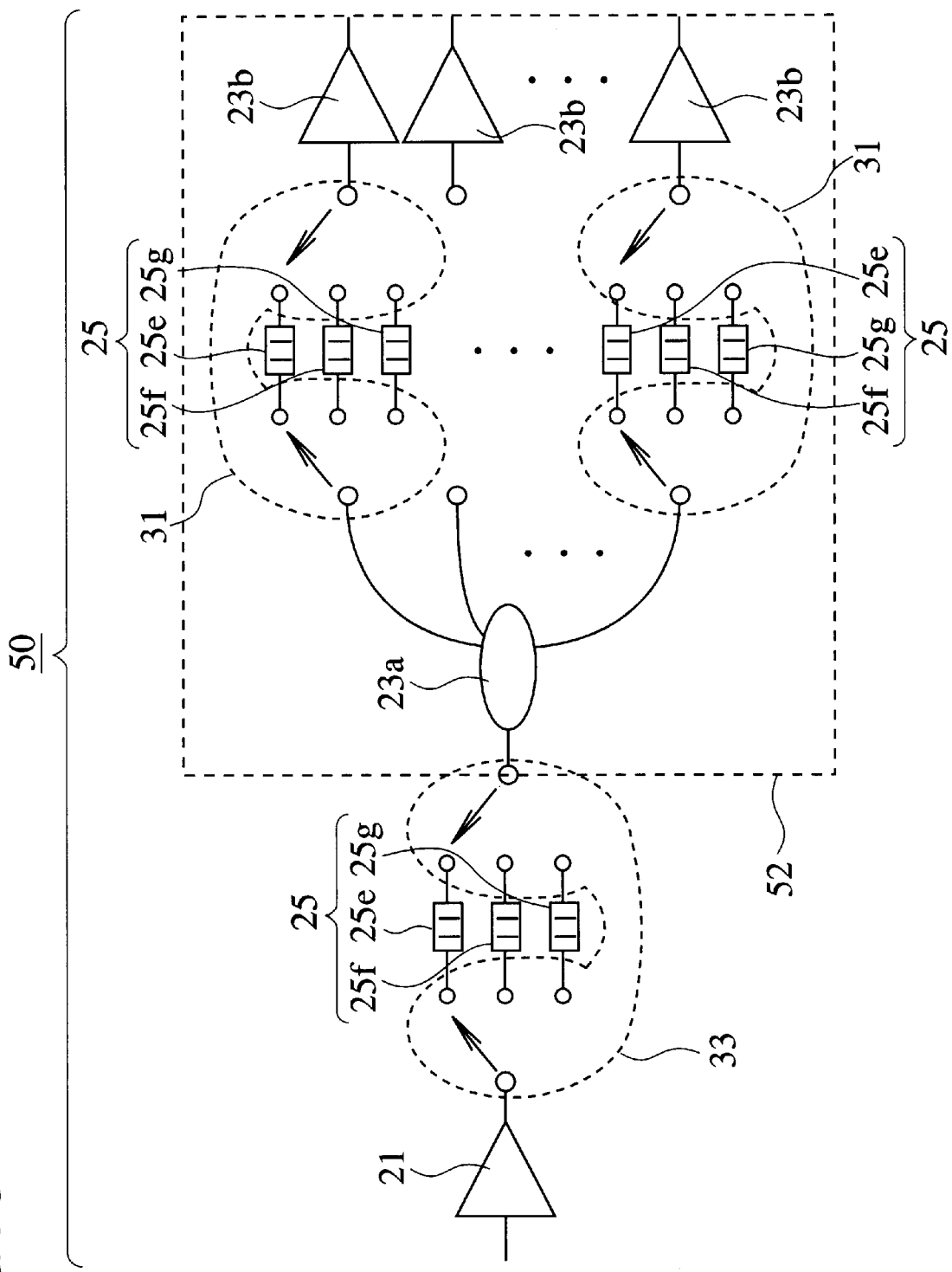
FIG. 6, which is a diagram illustrating an optical amplifier having an optical-demultiplexing or wavelength-division function and pertaining to a fourth aspect of the embodiment of the present invention, depicts a configurational example that is different from the configurational example in FIG. 5 and that is designed to compensate for wavelength dependency output power difference.

FIG. 6 is a diagram depicting the optical amplifier 50 pertaining to the fourth embodiment.

The optical amplifier 50 pertaining to the fourth embodiment comprises second optical components 25, each of which is obtained by grouping together a plurality of types (Q types, where Q is any integer of 2 or greater) of suboptical components 25e–25g designed to compensate for wavelength dependency output power difference and disposed between the N output terminals of the first optical component 23a and the input terminals of the optical amplification means 23b corresponding to these output terminals in the post-stage optical amplifier unit 52.

The optical amplifier 50 further comprises first optical switches 31 for switching and introducing (connecting) the output terminals of the first optical component 23a and the corresponding input terminals of the optical amplification means 23b. The first optical switches 31 are selectively switched to any of the plurality of types of suboptical components 25e–25g and introduced (connected) between the above-described terminals.

The optical amplifier 50 further comprises second optical components 25, each of which is obtained by grouping together a plurality of types (R types, where R is any integer of 1 or greater, including R=Q) of suboptical components 25e–25g designed to compensate for wavelength dependency output power difference and provided between the output terminal of the pre-stage optical amplifier unit 21 and the input terminal of the first optical component 23a.

The optical amplifier 50 further comprises second optical switches 33 for introducing (connecting) any of the plurality of types of suboptical components 25e–25g between the output terminal of the pre-stage optical amplifier unit 21 and the input terminal of the first optical component 23a.

The suboptical components 25e–25g (second optical components 25) can, for example, be any optical components selected from among optical filters having mutually different transmission characteristics, attenuators having mutually different attenuation characteristics, SFMs, or the like.

In the optical amplifier 50 pertaining to the fourth embodiment, any of the second suboptical components 25e–25g can be arbitrarily introduced between the pre-stage optical amplifier unit 21 and the first optical component 23a by the operation of the second optical switch 33. In addition, any of the second suboptical components 25e–25g can be arbitrarily introduced between the output terminals of the first optical component 23a and the corresponding optical amplification means 23b by the operation of the first optical switches 31.

In this case as well, detectors 210 and a control circuit 220 configured as described with reference to FIG. 4 should be provided in order to operate the optical amplifier by switching the optical switches 31 and 33. These detectors and control circuit are omitted from the drawing in order to avoid the completing of the drawing, and no pertinent description is given because these components operate in the same manner as those described with reference to FIG. 4.

Of the plurality of types of suboptical components 25e–25g (second optical components 25), those that have the desired characteristics can therefore be introduced into the transmission line of the optical amplifier. The result is that in comparison with the optical amplifier pertaining to the third embodiment, the optical amplifier pertaining to the fourth embodiment provides greater latitude in compensating for the wavelength dependency output power difference, making it possible to reduce the optical output power difference across a broader wavelength band (input wavelength band and wavelength band).

Fifth Embodiment

Figure 7:
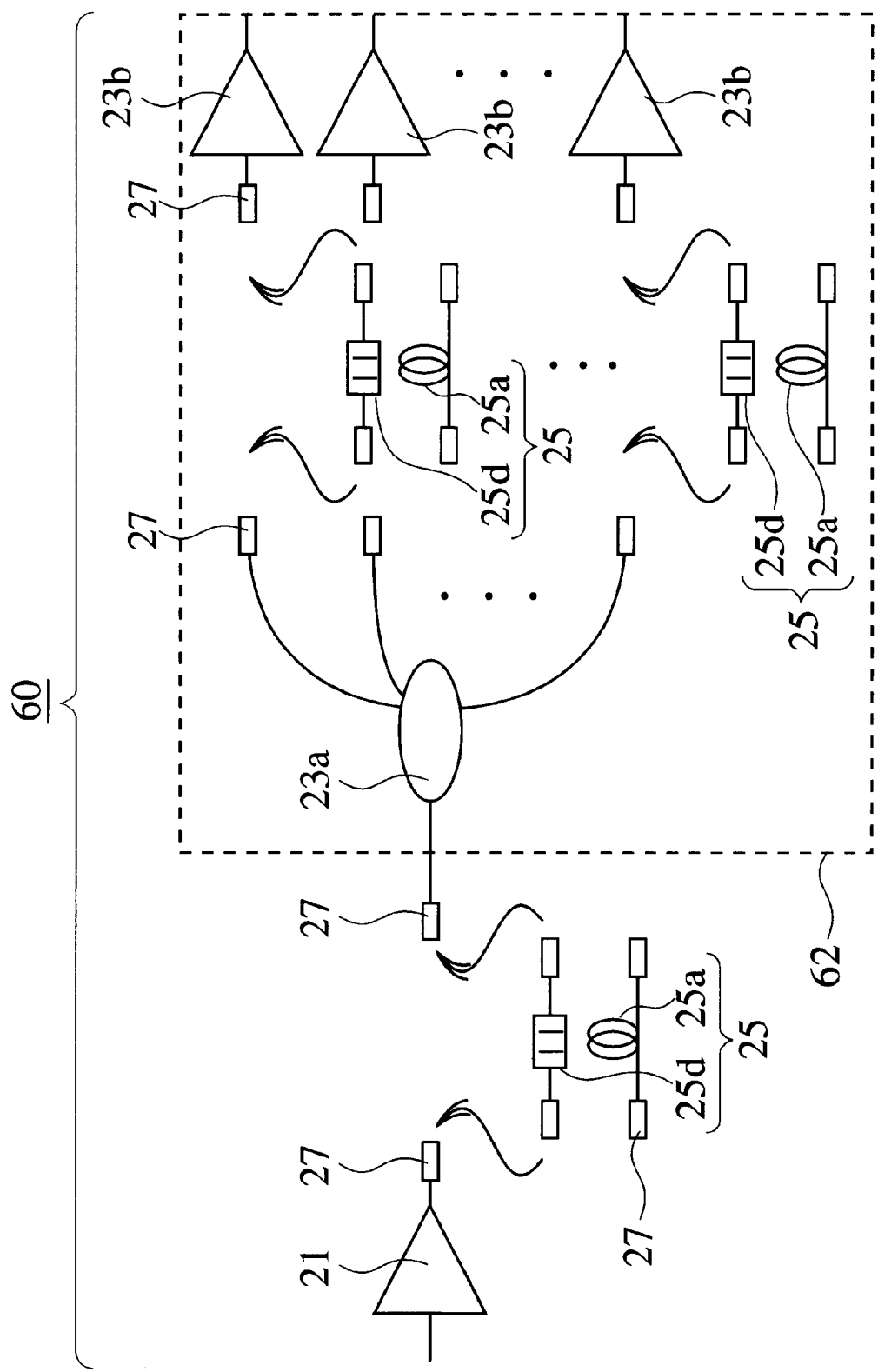
FIG. 7, which is a diagram illustrating an optical amplifier having an optical-demultiplexing or wavelength-division function and pertaining to a fifth aspect of the embodiment of the present invention, depicts a configurational example of an optical amplifier that can be designed to have chromatic dispersion compensation functions and functions designed to compensate for wavelength dependency output power difference.

FIG. 7 is a diagram illustrating an optical amplifier 60 pertaining to a fifth embodiment.

In the optical amplifier 60 pertaining to the fifth embodiment, an optical component 25a having chromatic dispersion compensation functions and an optical component 25d designed to compensate for wavelength dependency output power difference are disposed in a mixed arrangement as second optical components 25 between the output terminal of the pre-stage optical amplifier unit 21 and the input terminal of the first optical component 23a. Alternatively, optical components 25a having a chromatic dispersion compensation function and optical components 25d designed to compensate for wavelength dependency output power difference can be disposed in a mixed arrangement as second optical components 25 between the output terminals of the first optical component 23a and the optical amplification means 23b in the post-stage optical amplifier unit 62 instead of the above-described arrangement or in addition thereto. The manner in which the two types of optical components 25a and 25d are arranged together can be arbitrarily established in accordance with the design.

The optical amplifier 60 pertaining to the fifth embodiment yields the effects described with reference to the first embodiment as well as the effects described with reference to the third embodiment. The optical amplifier 60 pertaining to the fifth embodiment yields the following effects: chromatic dispersion can be compensated for, higher output power can be obtained across a broad wavelength band, wavelength dependency output power difference can be reduced, and power consumption can be curtailed.

According to a modified example of the optical amplifier 60 pertaining to the fifth embodiment, optical components (for example, optical filters, optical attenuators, or the like) devoid of chromatic dispersion compensation functions may also be provided between the output terminal of the pre-stage optical amplifier unit 21 and the input terminal of the first optical component 23a, and optical components (for example, DCFs, PMGs, or the like) having chromatic dispersion compensation functions may be provided between the fat output terminals of the first optical component 23a and the optical amplification means 23b of the post-stage optical amplifier unit 62. Such a configuration has the effect of making it easier for the characteristics of the optical amplifier to be kept constant because presetting the output of the pre-stage optical amplifier unit 21 to a high level makes it possible to adjust the attenuation of the optical components (optical filters or optical attenuators) provided between the pre-stage optical amplifier unit 21 and the first optical component 23a even when, for example, reduction occurs due to the degradation or the like of the pre-stage optical amplifier unit 21.

Sixth Embodiment

Figure 8:
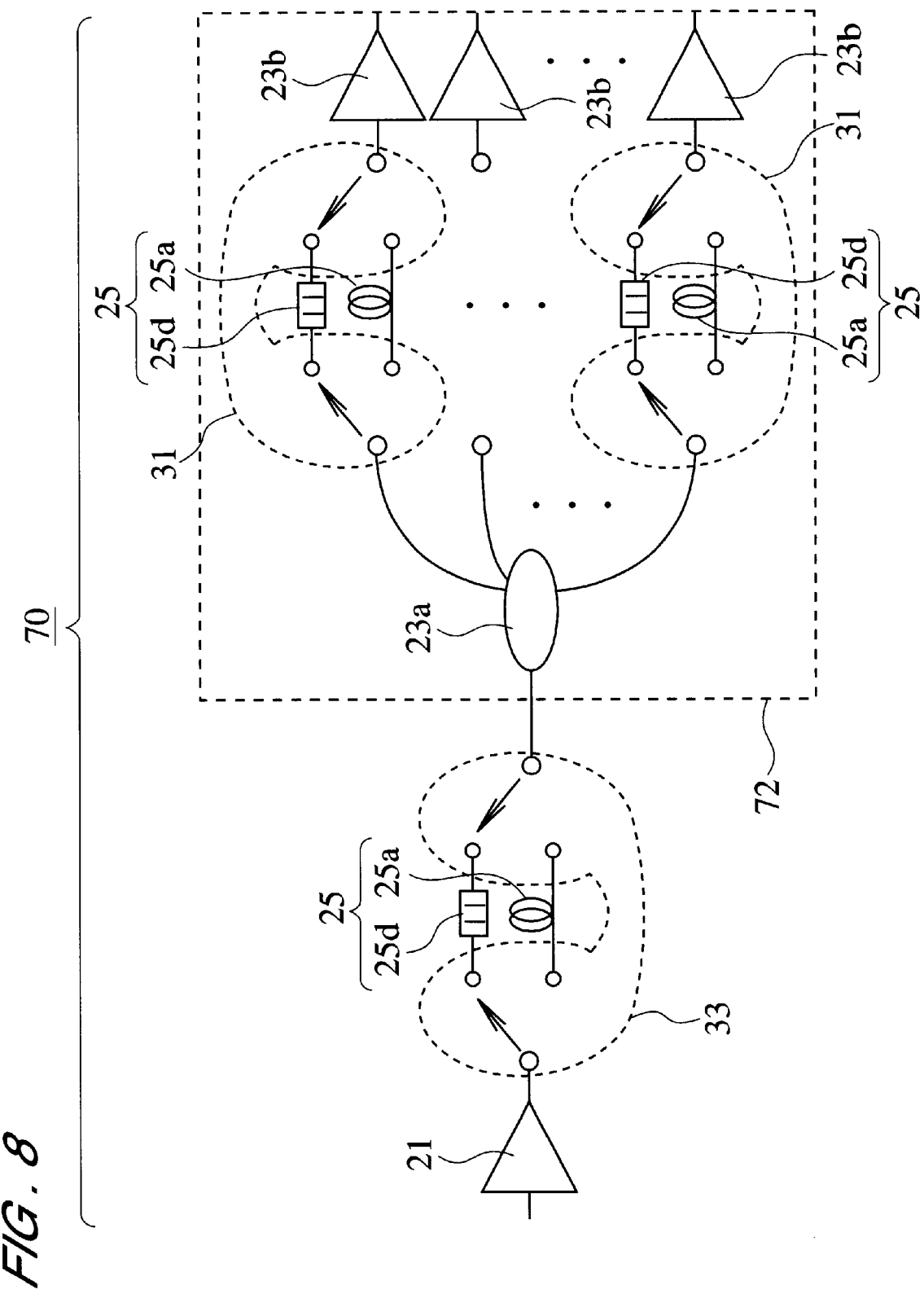
FIG. 8, which is a diagram illustrating an optical amplifier having an optical-demultiplexing or wavelength-division function and pertaining to a sixth aspect of the embodiment of the present invention, depicts another configurational example of an optical amplifier that can be designed to have a chromatic dispersion compensation functions and functions designed to compensate for wavelength dependency output power difference.

FIG. 8 is a diagram illustrating an optical amplifier 70 pertaining to a sixth aspect of the embodiment.

The optical amplifier 70 pertaining to the sixth embodiment is equipped in advance with two suboptical components (an optical component 25d designed to compensate for wavelength dependency output power difference, and an optical component 25a having chromatic dispersion compensation functions) as the second optical components 25 between the output terminal of the pre-stage optical amplifier unit 21 and the input terminal of the first optical component 23a. Alternatively, the two types of optical components (optical components 25d designed to compensate for wavelength dependency output power difference, and optical components 25a having chromatic dispersion compensation functions) are provided in advance between the output terminals of the first optical component 23a and the corresponding input terminals of the optical amplification means 23b in the post-stage optical amplifier unit 72 instead of the above-described arrangement or in addition thereto. It is apparent that the suboptical components thus prepared can number three or more.

The optical amplifier 70 is also provided with first optical switches 31 and a second optical switch 33 in order to make it easier to selectively switch the aforementioned suboptical component 25a and suboptical components 25d. The first and second optical switches 31 and 33 can, for example, be arranged in the manner described in the section related to the second aspect of the embodiment.

In the optical amplifier 70 pertaining to the sixth embodiment, the suboptical components introduced between the output terminal of the pre-stage optical amplifier unit 21 and the input terminal of the first optical component 23a, and/or between the output terminals of the first optical component 23a and the input terminals of the optical amplification means 23b can be arbitrarily selected from among the optical components 25a, which have chromatic dispersion compensation functions; optical components 25d, which are designed to compensate for wavelength dependency output power difference; and appropriate combinations thereof. Consequently, the optical amplifier 70 pertaining to the sixth embodiment can be expected to yield the same effect as the optical amplifier pertaining to the fifth embodiment.

Another feature of the optical amplifier 70 pertaining to the sixth embodiment is that any of suboptical components 25a or 25d can be selected as the second optical components 25 by means of the optical switches 31 and/or 33.

In this case as well, detectors 210 and a control circuit 220 configured as described with reference to FIG. 4 should be provided in order to operate the optical amplifier by switching the optical switches 31 and 33. These detectors and control circuit are omitted from the drawing in order to avoid the complexing of the drawing, and no pertinent description is given because these components operate in the same manner as those described with reference to FIG. 4.

Consequently, the optical amplifier pertaining to the sixth embodiment affords considerable latitude in the selection and connection of optical components, and such selection and connection can be easily performed using optical switches. The optical amplifier pertaining to the sixth embodiment can therefore be regarded as an optical amplifier capable of better responding to changes in the environment (changes in transmission lines, changes in optical amplifier specifications, or the like) than is the amplifier pertaining to the fifth embodiment.

Seventh Embodiment

Figure 9:
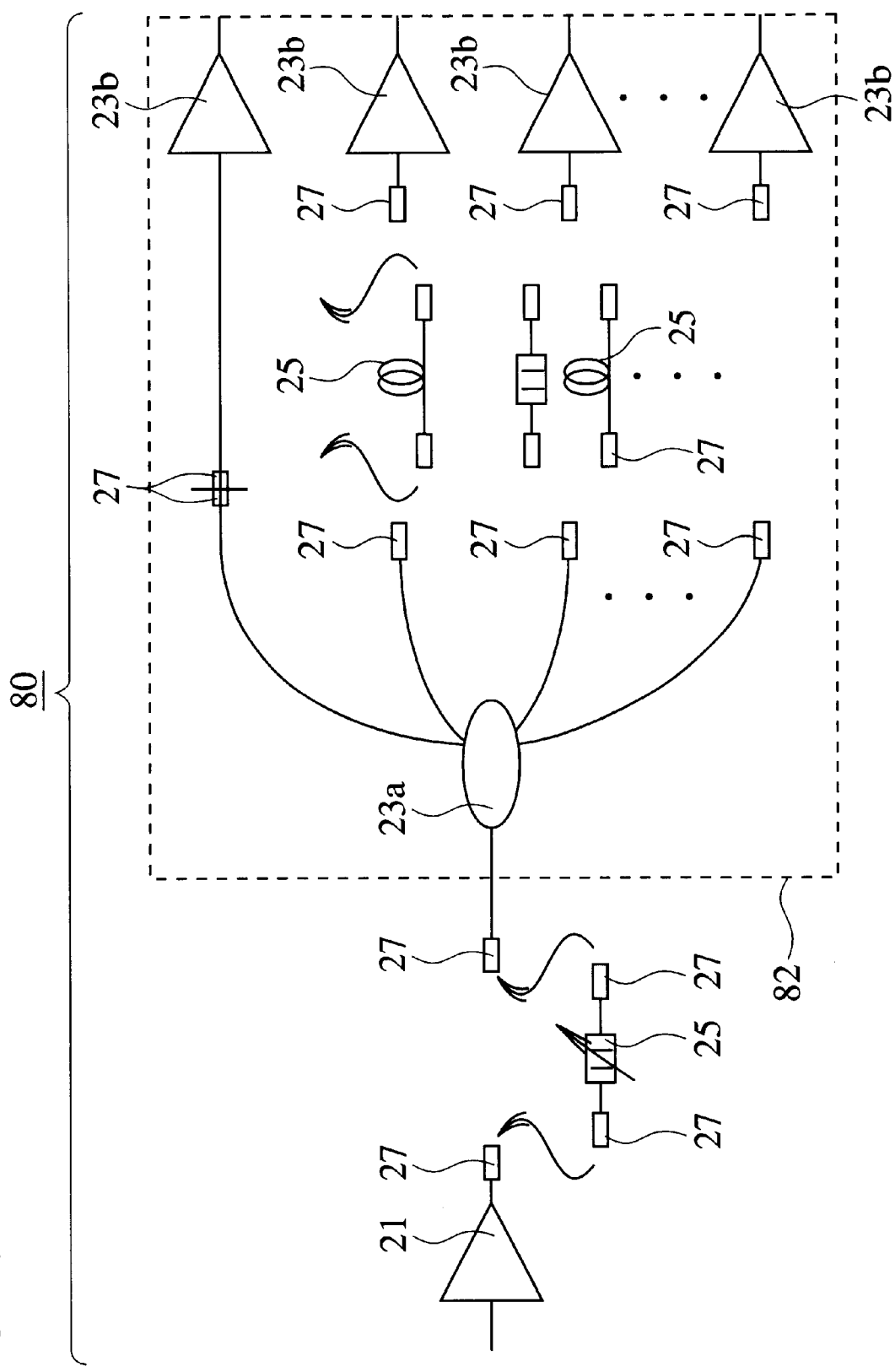
FIG. 9, which is a diagram illustrating an optical amplifier having an optical-demultiplexing or wavelength-division function and pertaining to a seventh aspect of the embodiment of the present invention, depicts a configurational example of an optical amplifier used when an optical signal does not require compensation for chromatic dispersion, compensation for wavelength dependency output power difference, or other treatments.

FIG. 9 is a diagram illustrating an optical amplifier 80 pertaining to a seventh embodiment.

Signal light that is output from the N output terminals of the first optical component 23a contains signal light that does not require any compensation for chromatic dispersion, compensation for wavelength dependency output power difference, or other treatments. Such signal light should preferably be input to the optical amplification means 23b without being transmitted through second optical components because this type of input makes it possible to reduce unnecessary losses in the optical amplifier. The seventh embodiment shown in the figure pertains to a configurational example of an optical amplifier for WDM signals containing such signal light (signal light for which not treatment is needed).

In view of this, the optical amplifier 80 pertaining to the seventh embodiment is an optical amplifier in which a direct connection (without the intervening second optical components) with the optical amplification means 23b is established for those of the N output terminals of the first optical component 23a (a case in which all the terminals are involved is also acceptable) that output signal light for which there are no requirements to compensate for chromatic dispersion, to compensate for wavelength dependency output power difference, or to perform other required treatments. It is apparent that the second optical components are introduced and connected in advance between the terminals associated with signal light for which such prescribed treatments are required, using the same technique as that described with reference to any of the first to sixth embodiment.

The optical amplifier 80 pertaining to the seventh embodiment is devoid of any redundant optical components, resulting in a proportional reduction in the degree to which the output of the pre-stage optical amplifier unit 21 is lowered. Consequently, the gain of the pre-stage optical amplifier unit 21 can be kept at the desired level to a degree at which the noise factor of a post-stage optical amplifier unit 82 can be ignored in comparison with the total NF of the optical amplifier 80.

Eighth Embodiment

The first to seventh embodiments described above pertained to examples of optical amplifiers consisting of optical amplifier units connected in two stages. The present invention, however, can also be adapted to optical amplifiers comprising three or more stages of optical amplifier units. The eighth embodiment pertains to a configurational example of an optical amplifier comprising three or more stages of optical amplifier units.

Figure 10:
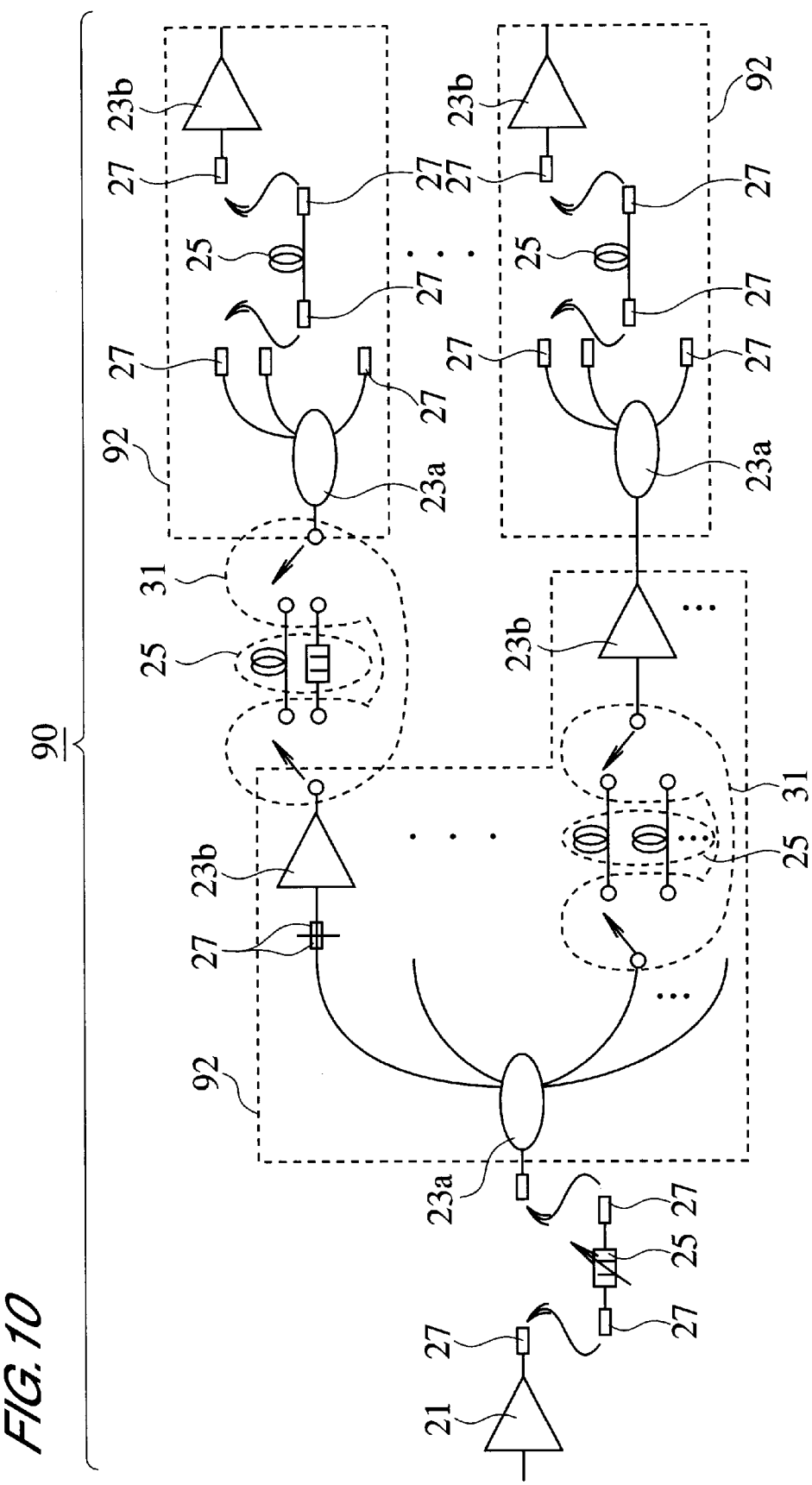
FIG. 10, which is a diagram illustrating an optical amplifier having an optical-demultiplexing or wavelength-division function and pertaining to an eighth aspect of the embodiment of the present invention, is a configurational example of an optical amplifier comprising three or more stages of optical amplifier units.

FIG. 10 is a diagram illustrating an optical amplifier 90 pertaining to the eighth embodiment. In the configurational example of the optical amplifier 90, a post-stage optical amplifier unit 92 comprising a first optical component 23a and an optical amplification means 23b for the individual amplification of signal light from any of the output terminals of the first optical component 23a constitutes a single block, and two or more such blocks are connected in a cascade arrangement. It is apparent that the manner in which the blocks 92 are arranged is not limited to the example in FIG. 9 and may include any arrangement that conforms to the design of the optical amplifier. For example, the blocks 92 may be connected in parallel.

For example, any of the post-stage optical amplifier units described with reference to the first to seventh embodiment can be used as such blocks 92. In addition, separate second optical components (suboptical components) 25 may occasionally be introduced between the two blocks 92 connected in cascade.

In this case as well, detectors 210 and a control circuit 220 configured as described with reference to FIG. 4 should be provided in order to operate the optical amplifier by switching the optical switches 31 and 33. These detectors and control circuit are omitted from the drawing in order to avoid the complexing of the drawing, and no pertinent description is given because these components operate in the same manner as those described with reference to FIG. 4.

The optical amplifier 90 pertaining to the eighth embodiment can provide even higher gain because the optical amplifier units are connected into a larger number of stages. A longer span can therefore be designed for the compensation of losses in transmission lines. Specifically, compensation for losses in transmission lines can be achieved with longer transmission lines.

(2) Embodiments of Second Invention

The optical amplifier of the first invention was described with reference to examples in which signal light was optically demultiplexed or separated and the separated light was amplified by the optical amplification means of a post-stage optical amplifier unit. By contrast, the second invention pertains to an optical amplifier in which some or all of a plurality of signals are amplified as individual signals, and this plurality of signals is then optically multiplexed or synthesized.

FIG. 11 is a diagram illustrating the optical amplifier 100 pertaining to an embodiment of the second invention.

The optical amplifier 100 according to this embodiment is an optical amplifier obtained by the cascade connection of a pre-stage optical amplifier unit 101 and a post-stage optical amplifier unit 103.

The pre-stage optical amplifier unit 101 comprises a first optical component 101a of N inputs and a single output that has an optical-multiplexing (or wavelength-synthesizing) function, a plurality of optical amplification means 101b connected to the corresponding output terminals thereof, and second optical components 25 and/or combination components comprising the second optical components and optical switches 105, which are provided between the output terminals of all or some of the first optical component 101a and the corresponding optical amplification means 101b. In accordance with the P input terminals (where P is an integer from 1 to N, or N in the illustrated example) selected from among the N input terminals of the first optical component 101a, P (N in the illustrated example) units of such optical amplification means 101b are provided.

Each of the N units of optical amplification means 101b amplifies the signal light designated for input to the corresponding input terminal of the first optical component 101a, and inputs the result to this corresponding input terminal.

The optical amplifier 100 of the second invention may also have second optical components 25 between the output terminals of the optical amplification means 101b and the input terminals of the first optical component 101a, and/or between the output terminal of the first optical component 101a and the input terminal of the post-stage optical amplifier unit 103. These second optical components 25 can be selected from among the optical components described with reference to the first invention.

In this case as well, detectors 210 and a control circuit 220 configured as described with reference to FIG. 4 should be provided in order to operate the optical amplifier by switching the optical switches 31 and 33. These detectors and control circuit are omitted from the drawing in order to avoid the complexing of the drawing, and no pertinent description is given because these components operate in the same manner as those described with reference to FIG. 4.

The first optical component 101a, optical amplification means 101b, second optical components 25, post-stage optical amplifier unit 103, and other optical components may be connected to each other with optical connectors 27, optical switches 105, or the like.

In addition, the output terminals of the optical amplification means 101b and the input terminals of the first optical component 101a may also be terminals that are connected directly, without the intervening second optical components 25. In the absence of second optical components 25 or other introduced and connected components, the input terminals of the first optical component 101a and the output terminals of the optical amplification means 101b may be connected using optical connectors, or these connections may be formed directly by welding or the like, without the use of optical connectors.

In the optical amplifier 100, the signal light that has been input to the optical amplification means 101b is amplified by these optical amplification means and is then synthesized by the first optical component 101a. The synthesized signal light is amplified by the post-stage optical amplifier unit 103 and is output to the next stage.

Such an optical amplifier 100 may, for example, be used when a plurality of signals are received as a packet and are then amplified.

This is because each part of composite signal light is amplified separately, chromatic dispersion is compensated for, and/or the wavelength dependency output power difference is compensated for, etc., yielding a WDM signal whose characteristics are better than those obtained when a plurality of signals are amplified as a packet, chromatic dispersion is compensated for, and/or the wavelength dependency output power difference is compensated for.

The above description concerned some aspects of the embodiments of the optical amplifier pertaining to the present invention, but the present invention is not limited in any way to the above-described aspects of the embodiments and allows numerous modifications or variations to be added.

When the optical amplification means are composed of EDFAs, the pumping system adopted may be that of forward pumping, backward pumping, or bidirectional pumping.

The present invention may also be adapted to cases in which optical amplifier units are connected in parallel in two or more stages.

In addition, the optical amplification means are not limited to EDFAs alone. Praseodymium-doped fiber amplifiers, neodymium-doped fiber amplifiers, and other fiber amplifiers doped with rare-earth elements other than erbium may be used as such optical amplification means. It is also possible to use semiconductor optical amplifiers or optical amplification means having the same pumping mechanism or pumping characteristics. It is further possible to use Raman amplifiers or the like.

Although the above embodiments were described with reference to DCFs or FBGs as the optical components whose function is to compensate for chromatic dispersion, it is also possible to use etalons or any other optical components whose function is to compensate for chromatic dispersion. In addition, optical components devoid of chromatic dispersion compensation functions and optical components capable of compensating for wavelength dependency output power difference are not limited to the previously described optical components, and various optical components having the same functions can also be used.

Furthermore, the aspects of embodiments of the first invention were described with reference to examples in which the present invention was adapted to a post-stage optical amplifier unit, but the present invention may also be adapted to the pre-stage optical amplifier unit 21.

Moreover, the aspects of embodiments of the second invention were described with reference to examples in which the present invention was adapted to the pre-stage optical amplifier unit 101, but the present invention may also be adapted to the post-stage optical amplifier unit 103.

The above description indicates that the optical amplifier of the present invention comprises a first optial component of M inputs and N outputs that has an optical-demultiplexing or wavelength-separating function, and P units of optical amplification means for the individual amplification of signal light that is output from P output terminals selected from among the N output terminals of the first optical component.

Consequently, wavelength-multiplexed signal light can be separated as individual portions of signal light or as signal light having a plurality of bandwidths. Out of the N types of signal light obtained by such wave separation, P types of signal light can be individually amplified by optical amplification means.

Furthermore, there is no need for each of the P units of optical amplification means to amplify all the WDM signals, which can therefore be amplified individually, one separated part of signal light at a time. It is therefore possible to provide an optical amplifier designed to amplify signal light in the form of portions of signal light of a narrower bandwidth than in the past, one portion at a time. Separated signal light can therefore be amplified as desired. Consequently, combining signal light that is output by individual optical amplification means yields a WDM signal having a small optical output power difference and high output power across a broad wavelength band.

What is claimed is:

1. An optical amplifier, comprising:
    an optical amplifier unit having:
        a first optical component including M input terminals and N output terminals, said first optical component having an optical-demultiplexing function,
        front amplification means for amplifying a plurality of light signals having respective wavelengths; and
        P units of optical amplification means for individually amplifying light signals that are output from P output terminals selected from among said N output terminals of said first optical component, wherein M is an integer of 1 or greater, N is an integer of 2 or greater, and P is an integer, wherein $1 \leq P \leq N$ from 1 to N.

2. The optical amplifier according to claim 1, wherein said optical amplifier comprises a pre-stage optical amplifier unit and a post-stage optical amplifier unit coupled to said pre-stage optical amplifier unit, wherein said optical amplifier unit includes said post-stage optical amplifier unit.

3. The optical amplifier according to claim 1, wherein said first optical component includes an optical connector for each of said M input terminals and said N output terminals; and
    said P units of optical amplification means each have an optical connector at least for each of the P output terminals selected from said N output terminals of said first optical component.

4. The optical amplifier according to claim 1, further comprising second optical components connected to said M input terminals of said first optical component.

5. The optical amplifier according to claim 1, further comprising second optical components disposed between input terminals of said optical amplification means and corresponding ones of said N output terminals of said first optical components.

6. The optical amplifier according to claim 4, wherein said second optical components include optical components selected from optical components having chromatic dispersion compensation functions and optical components having wavelength dependency output power difference compensation functions.

7. The optical amplifier according to claim 2, further comprising:
    second optical components disposed between said first optical component and said pre-stage optical amplifier unit; and
    a plurality of optical connectors individually connected between said N output terminals of said first optical component and corresponding input terminals of said optical amplification means, between an output terminal of said pre-stage optical amplifier and input terminals of said second optical component, and between output terminals of said second optical component and said M terminals of said first optical component.

8. The optical amplifier according to claim 7, wherein said second optical components include optical components having chromatic dispersion compensation functions.

9. The optical amplifier according to claim 2, further comprising:
    second optical components disposed between said first optical component and said optical amplification means; and
    a plurality of optical connectors individually connected between an output terminal of said pre-stage optical amplifier unit and corresponding ones of said M input terminals of said first optical component, between said N output terminals of said first optical component and input terminals of said second optical components and between output terminals of said second optical components and input terminals of said optical amplification means.

10. The optical amplifier according to claim 9, wherein said second optical components include optical components having chromatic dispersion functions.

11. The optical amplifier according to claim 1, further comprising the following components disposed between the input terminals of said optical amplification means and said N output terminals of said first optical component:
    second optical components including a plurality of types of suboptical components; and
    first optical switched that switch any of said suboptical components between the input terminals of said optical amplification means and said output terminals of said first optical component.

12. The optical amplifier according to claim 11, wherein said plurality of types of suboptical components include optical filters having mutually different transmission characteristics.

13. The optical amplifier according to claim 11, wherein said plurality of types of suboptical components include optical components having chromatic dispersion compensation functions, and at least some others of said plurality of types of the suboptical components include optical components having wavelength dependency output power difference compensating functions.

14. The optical amplifier according to claim 5, wherein said second optical components include optical components selected from optical components having chromatic dispersion compensation functions and optical components having wavelength dependency output power difference compensation functions.

15. An optical amplifier, comprising:
    a plurality of optical amplifier units connected in two or more stages, at least one of said optical amplifier units comprising:

a first optical component including M input terminals and N output terminals, said first optical component having an optical-demultiplexing function;

front amplification means for amplifying a plurality of light signals having respective wavelengths, and P units of optical amplification means for individually amplifying light signals that are output from P output terminals selected from among the N output terminals of said first optical component, wherein M is an integer of 1 or greater, N is an integer of 2 or greater, and P is an integer, wherein $1 \leq P \leq N$.

16. The optical amplifier according to claim 15, wherein said at least one of said optical amplifier units is an optical amplifier disposed at a second or subsequent stage.

17. An optical amplifier, comprising:

an optical amplifier unit having:

a first optical component including N input terminals and M output terminals, said first optical component having an optical-multiplexing function, front amplification means for amplifying a plurality of light signals having respective wavelengths, and P units of optical amplification means for individually amplifying light signals to be input to P input terminals selected from among said N input terminals of said first optical component, wherein N is an integer of 2 or greater, M is an integer of 1 or greater, and P is an integer from $1 \leq P \leq N$, to N; wherein 1.

18. The optical amplifier according to claim 17, wherein said optical amplifier comprises a pre-stage optical amplifier unit and a post-stage optical amplifier unit coupled to said pre-stage optical amplifier unit, said optical amplifier unit including said post-stage optical amplifier unit.

19. The optical amplifier according to claim 17, further comprising second optical components connected to said M output terminals of said first optical component.

20. The optical amplifier according to claim 17, further comprising second optical components disposed between output terminals of said optical amplification means and said N input terminals of said first optical component.

21. The optical amplifier according to claim 19, wherein said second optical components include optical components selected from optical components having chromatic dispersion compensation functions and optical components having wavelength dependency output power difference compensation functions.

22. The optical amplifier according to claim 20, wherein said second optical components include optical components selected from optical components having chromatic dispersion compensation functions and optical components having wavelength dependency output power difference compensation functions.

23. An optical amplifier, comprising:

a plurality of optical amplifier units having an initial stage and at least one or more subsequent stages, said optical amplifier unit of the initial stage comprising:

a first optical component including N input terminals and M output terminals, said first optical-multiplexing function, and P units of optical amplification means for individually amplifying light signals to be input to P input terminals selected from said N input terminals of said first optical component, and for individually inputting the light signals to the input terminals of said first optical component designated for such input, wherein N is an integer of 2 or greater, M is an integer of 1 or greater, and P is an integer, wherein $1 \leq P \leq N$.

* * * * *